(12) United States Patent　(10) Patent No.: US 6,983,734 B2
Muto　(45) Date of Patent: Jan. 10, 2006

(54) INTAKE FLOW RATE DETECTING APPARATUS OF INTERNAL COMBUSTION ENGINE AND METHOD OF SAME

(75) Inventor: Harufumi Muto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 66 days.

(21) Appl. No.: 10/449,599

(22) Filed: Jun. 2, 2003

(65) Prior Publication Data

US 2003/0230277 A1　Dec. 18, 2003

(30) Foreign Application Priority Data

Jun. 12, 2002　(JP) .............................. 2002-171270

(51) Int. Cl.
　　*F02D 41/18*　(2006.01)
(52) U.S. Cl. ................. 123/308; 123/184.55; 73/118.2
(58) Field of Classification Search ................ 123/306, 123/308, 184.55, 442, 488, 494; 73/118.2
See application file for complete search history.

(56) References Cited

U.S. PATENT DOCUMENTS 4,594,987 A * 6/1986 Wataya et al. ............... 123/494
4,873,641 A * 10/1989 Nagaishi et al. ........... 73/118.2

FOREIGN PATENT DOCUMENTS

| JP | A 4-308337 | 10/1992 |
| JP | A 5-248294 | 9/1993 |
| JP | A 10-196373 | 7/1998 |
| JP | A 10-339205 | 12/1998 |
| JP | A 11-287136 | 10/1999 |
| JP | A 2000-328947 | 11/2000 |
| JP | A 2001-303960 | 10/2001 |
| JP | 2001-153702 A | * 6/2004 |

* cited by examiner

*Primary Examiner*—Andrew M. Dolinar
(74) *Attorney, Agent, or Firm*—Oliff & Berridge, PLC

(57) ABSTRACT

In order to provide an intake flow rate detecting apparatus of an internal combustion engine which accurately compensates for an air flow meter detection error due to intake pulsation so as to make it possible to detect an intake flow rate more accurately, regardless of the of type of flow rate control mechanism, an intake flow rate detecting apparatus according to one embodiment of the invention includes a throttle valve which is provided in an intake passage and which adjusts a rate of the air that is taken into a combustion chamber of an internal combustion engine, at least one flow rate control mechanisms which are provided between the throttle valve and the combustion chamber and which control an air flow rate between the throttle valve and the combustion chamber, and a flow rate sensor which is provided upstream of the throttle valve in the intake passage and which detects a flow rate of air flowing through the intake passage. The intake flow rate detecting apparatus corrects a detection value of the flow rate sensor based on an opening of the throttle valve, an operation amount of the flow rate control mechanism and a speed of the internal combustion engine so as to detect a rate of air which is actually taken into the combustion chamber.

13 Claims, 7 Drawing Sheets

INTAKE FLOW RATE DETECTING APPARATUS OF INTERNAL COMBUSTION ENGINE AND METHOD OF SAME

INCORPORATION BY REFERENCE

The disclosure of Japanese Patent Application No. 2002-171270 filed on Jun. 12, 2002 including the specification, drawings and abstract is incorporated herein by reference in its entirety.

BACKGROUND OF THE INVENTION

1. Field of the Invention

The invention relates to an intake flow rate detecting apparatus of an internal combustion engine which detects a rate of intake air flowing through an intake passage while compensating for intake pulsation and the like in the intake passage of the internal combustion engine for a vehicle, and a method thereof.

2. Description of the Related Art

In order to monitor an operation state of an internal combustion engine for a vehicle and perform various controls of the engine, a flow rate sensor is frequently provided upstream of a throttle valve, and an intake flow rate of the engine is calculated based on an output from this flow rate sensor.

As such a flow rate sensor, a vane air flow meter was previously used. This vane air flow meter includes a vane which is pushed to open due to a pressure difference that is generated when intake air passes therethrough, and the intake flow rate is measured by detecting the vane opening using a potentiometer or the like. However, this vane air flow meter has some drawbacks. For example, responsiveness is poor since the intake flow rate is measured based on the vane opening, and pressure loss in the intake passage is increased by the vane. Therefore, the most commonly used type of flow rate sensor at present is a thermal air flow meter in which a heater whose temperature is lowered by air flowing through the intake passage is embedded in a bridge circuit, and which measures the intake flow rate by compensating for the temperature of the heater. Unlike the vane air flow meter, since this thermal air flow meter does not include any moving parts, it does not have the above-mentioned drawbacks. In addition, since intake air weight is measured by this thermal air flow meter, calculation of the intake flow rate is less subject to a change in air density due to a change in the temperature or atmospheric pressure.

However, in the case of the above-mentioned thermal air flow meter, not only the rate of the air flowing toward a combustion chamber of an engine but also the rate of the air which is generated due to intake pulsation, that is, the rate of the air flowing in the reverse direction, is detected as the rate of the air which is taken into the combustion chamber. Therefore, when intake pulsation is generated, such a thermal air flow meter is directly affected by the intake pulsation, and accordingly, an output therefrom tends to be larger than the actual intake flow rate.

However, in a low load state in which the opening of the throttle valve is small, even when the intake pulsation is generated, this throttle valve itself functions as a wall which prevents the air flowing in the reverse direction from reaching the air flow meter. Accordingly, even in the case of the thermal air flow meter, the detection error is relatively small. However, in a high load state in which the opening of the throttle valve is large, the effect from the intake pulsation cannot be ignored. Namely, in this case, when the intake pulsation is generated due to opening or closing of the intake valve, the air flowing in the reverse direction due to the intake pulsation easily reaches the air flow meter through the throttle valve that is open wide. Consequently, an error in a detection performed by the thermal air flow meter becomes large.

Therefore, conventionally, in order to compensate for such an error in detection performed by the thermal air flow meter (hereinafter, referred to as "thermal air flow meter detection error"), a measure such as obtaining a pulsation correction coefficient whose parameters are a throttle opening and an engine speed, and multiplying the output from the air flow meter by the correction coefficient are being taken.

Recently, various mechanisms which control an air flow rate in the intake passage, particularly an air flow rate between the combustion chamber and the throttle valve, are frequently mounted on the internal combustion engine for a vehicle. Examples of such a mechanism, that is, a flow rate control mechanism, are a swirl control valve which generates a swirl flow in the air flowing into a cylinder (a combustion chamber), a variable valve mechanism which changes valve characteristics such as opening or closing time of an engine valve (an intake and exhaust valve), a lift amount thereof and the like, and a variable intake mechanism which changes an effective length of the intake passage. When such a flow rate control mechanism is provided, the intake pulsation often changes in an unexpected manner. Accordingly, even when the pulsation correction coefficient is obtained based on only the throttle opening and engine speed, as mentioned above, an error in detection performed by the air flow meter (hereinafter, referred to as an "air flow meter detection error") may not be able to be appropriately compensated for.

Not only the thermal air flow meter, but also an air flow meter which equally detects air flow due to intake pulsation in both directions and which outputs detection signals according to these flow rates, has the above-mentioned problem in which a degree of accuracy of compensation for the detection error is decreased due to the mounting of the flow rate control mechanism.

SUMMARY OF THE INVENTION

The invention is made in order to solve the above-mentioned problem. Accordingly, it is an object of the invention to provide an intake flow rate detecting apparatus of an internal combustion engine which accurately compensates for an air flow meter detection error due to intake pulsation so as to make it possible to detect an intake flow rate more accurately regardless of the type of flow rate control mechanism.

In order to achieve the above-mentioned object, an intake flow rate detecting apparatus according to one embodiment of the invention includes a throttle valve which is provided in an intake passage and which adjusts a rate of the air that is taken into a combustion chamber of an internal combustion engine, at least one flow rate control mechanisms which are provided between the throttle valve and the combustion chamber and which control an air flow rate between the throttle valve and the combustion chamber, a flow rate sensor which is provided upstream of the throttle valve in the intake passage and which detects the flow rate of air flowing through the intake passage, and a correcting portion which corrects a value detected by the flow rate sensor (hereinafter referred to as an "flow rate sensor detection value") based on an opening of the throttle valve, an operation amount of the flow rate control mechanism and a speed of the internal combustion engine.

As mentioned above, when the flow rate sensor is provided which equally senses air flowing through the intake passage regardless of the direction of flow and detect the air flow rates, the mounting of the flow rate control mechanism is a great factor that decreases a degree of accuracy of compensation for a detection error. Accordingly, in an embodiment according to the invention, a flow rate sensor detection value is corrected using not only an opening of the throttle valve and an engine speed but also an operation amount of the flow rate control mechanism as parameter. Note that the effect of an operation amount of the flow rate control mechanism on the above-mentioned intake pulsation and the like, or a state thereof can be experientially learned through an experiment in advance or the like. Accordingly, the flow rate sensor detection error due to intake pulsation or the like can be more accurately compensated for by using the operation amount of the flow rate control mechanism as a parameter in addition to the opening of the throttle valve and the engine speed.

In the intake flow rate detecting apparatus, correction of the flow rate sensor detection value may be performed as compensation for the intake pulsation according to the speed of the internal combustion engine at an operation time of the throttle valve and the flow rate control mechanism, following the operation of the throttle valve and the flow rate control mechanism.

As mentioned above, a predominating factor that causes an error in the flow rate sensor detection value is intake pulsation. According to the abovementioned configuration in which compensation is made for the intake pulsation, compensation can be made for the flow rate sensor detection error with a required minimum computation load.

Further, in the intake flow rate detecting apparatus, correction of the flow rate sensor detection value may be performed as compensation for the intake pulsation according to the speed of the internal combustion engine at an operation time of the throttle valve and the flow rate control mechanism, as well as for the air drift in the vicinity of the flow rate sensor, following the operation of the throttle valve and the flow rate control mechanism.

Normally, there is dispersion in distribution of the air flow rate in the intake passage. The air flow rate tends to increase closer to a wall surface of the intake passage, that is, a so-called drift is caused. In addition, the state of the drift changes according to an operation state (an operation amount) of the throttle valve and the flow rate control mechanism, and the engine speed, that is, according to the intake pulsation. Generally, since the flow rate sensor detects an air flow rate based on only part of the air flowing through the intake passage, in the case where the state of the drift changes, even when there is no change in the intake flow rate itself, the flow rate sensor detection value may be different from the value detected before the state of the drift changed. Thus, the flow rate sensor detection error may be caused not only due to the intake pulsation but also due to the drift in the intake passage. However, according to the above-mentioned configuration in which compensation is made for the flow rate sensor detection error not only due to the intake pulsation but also due to the drift, compensation for the detection error can be made more accurately, which makes it possible to detect the intake flow rate with greater accuracy. The state of the drift can be experientially learned through experiment or the like based on the relationship between the operation amounts of the throttle valve and the flow rate control mechanism, and the engine speed.

The intake flow rate detecting apparatus may further include an upper limit calculating portion which obtains an upper limit for the flow rate sensor detection value based on the opening of the throttle valve, the operation amount of the flow rate control mechanism, and the speed of the internal combustion engine. The upper limit calculating portion calculates the upper limit as the rate of the air which is actually taken into the combustion chamber when the corrected flow rate sensor detection value exceeds the upper limit.

For example, when the flow rate sensor is a thermal flow rate sensor, and a detecting portion thereof gets wet due to rain water getting into the intake passage, condensation on an inside wall or the like, the output from the flow rate sensor may be extremely large. In such a case, even when the flow rate sensor detection value is corrected based on the opening of the throttle valve, the operation amount of the flow rate control mechanism and the engine speed, an accurate intake flow rate cannot be obtained.

According to the above-mentioned configuration, the detected value is limited to the upper limit for the flow rate sensor detection value which is calculated based on the opening of the throttle valve, the operation amount of the flow rate control mechanism and the engine speed which affect the intake flow rate. Accordingly, even when the above-mentioned exception occurs in the flow rate sensor detection value, an erroneous detection of the intake flow rate due to the unusual occurrence can be appropriately suppressed.

Further, in the intake flow rate detecting apparatus, the flow rate control mechanism may be a variable intake mechanism which changes an effective length of the swirl control valve that supplies a swirl flow to the air taken into the combustion chamber or an effective length of the intake passage.

First, when an opening of the swirl control valve changes, the flow rate of the air flowing through the intake passage changes according to the opening of the swirl control valve, which in turn changes the states of the intake pulsation and the drift. Also, when the length of the intake passage (i.e., the effective length of the intake pipe) through which the intake air flows is changed by the variable intake mechanism, the flow rate of the air flowing through the intake passage consequently changes. Accordingly, even when the variable intake mechanism is operated, the states of the intake pulsation and the drift change.

In the above-mentioned configuration, since correction of the flow rate sensor detection value or calculation of the upper limit is performed by taking the operation amount of these flow rate control mechanisms which affects the intake pulsation and the drift into consideration, accuracy in the correction and the calculation of the upper limit is high. As mentioned above, the states of the intake pulsation and the drift can be experientially learned through experiment or the like based on the relationship between the opening of the throttle valve and the engine speed, and the operation amount of each of the flow rate control mechanisms.

DETAILED DESCRIPTION OF PREFERRED EMBODIMENTS (First embodiment) Hereafter, a first embodiment of an intake flow rate detecting apparatus of an internal combustion engine according to the invention will be described in detail with reference to FIGS. 1 to 5.

Figure 1:
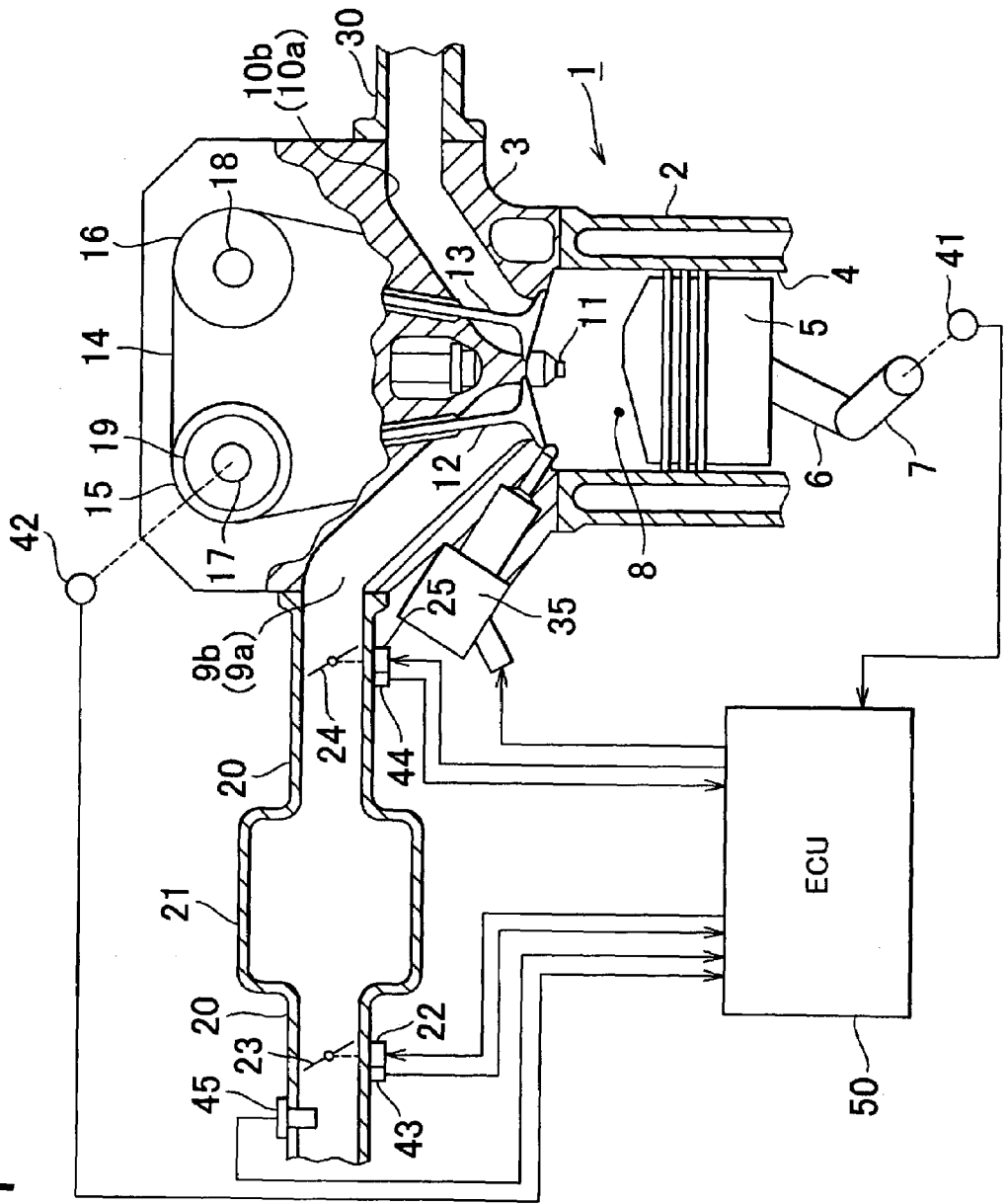
FIG. 1 is a schematic diagram showing an intake flow rate detecting apparatus according to the invention, a gasoline engine to which the intake air flow rate detector is applied, and a peripheral configuration thereof.

FIG. 1 is a schematic diagram showing an intake flow rate detecting apparatus according to the embodiment, a gasoline engine 1 to which this intake flow rate detecting apparatus is applied, and a peripheral configuration thereof. The gasoline engine 1 includes a plurality of cylinders 4 provided in a cylinder block 2 (in FIG. 1, only one cylinder is shown for convenience). A piston 5 is provided inside the cylinder 4, and the piston 5 is coupled with a crankshaft 7 through a con-rod 6.

A cylinder head 3 is attached to an upper portion of the cylinder block 2. A combustion chamber 8 is formed between an upper portion of the piston 5 and the cylinder head 3 in the cylinder 4. In the cylinder head 3, a fuel injection valve 35 which injects fuel directly into the combustion chamber 8 and a spark plug 11 which ignites an air-fuel mixture in the combustion chamber 8 are provided for each of the cylinders. In the cylinder head 3, a pair of intake ports 9a, 9b which are intake passages to the combustion chamber 8, and a pair of exhaust ports 10a, 10b which are exhaust passages from the combustion chamber 8 are provided for each of the cylinders (only the intake port 9b and the exhaust port 10b are shown in FIG. 1).

The intake ports 9a, 9b, and the exhaust ports 10a, 10b are connected to an intake passage 20 and an exhaust passage 30, respectively. A surge tank 21 for suppressing intake pulsation is provided in the intake passage 20. A throttle valve 23 whose opening is adjusted by an actuator 22 which is driven according to an accelerator pedal (not shown) operation is provided upstream of the surge tank 21. A rate of the air taken into the combustion chamber 8 is adjusted by changing the opening of the throttle valve 23. The intake passage 20, which is positioned downstream of the surge tank 21, branches off so as to correspond to each of the intake ports 9a, 9b. A swirl control valve (hereinafter, referred to as an "SCV") 24 for generating swirl in the combustion chamber 8 is provided in a portion of the intake passage 20 which corresponds to the intake port 9b. This SCV 24 is one of flow rate control mechanisms for controlling the air flow rate in the embodiment, and the opening thereof is adjusted by an actuator 25.

Figure 2:
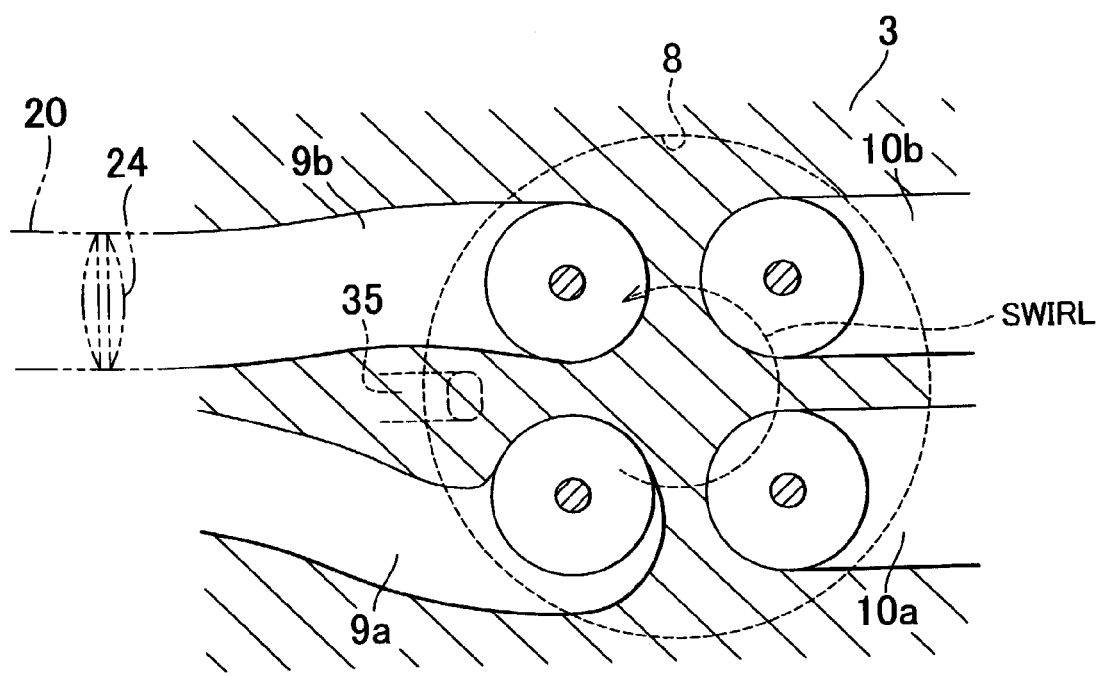
FIG. 2 is a representative cross-sectional view of a cylinder head showing the shapes of intake and exhaust ports in the gasoline engine.

FIG. 2 shows the plane cross sectional shape of the intake ports 9a, 9b, and the exhaust ports 10a, 10b. As shown in FIG. 2, the intake port 9a is a helical port which extends while curving, and the intake port 9b is a straight port which extends straight. When the degree of the opening of the SCV 24 is decreased and the rate of the air flowing into the intake port 9b is reduced, a difference is generated between the rate of the air passing through the intake port 9a and the rate of the air passing through the intake port 9b, which causes swirl in the direction shown by a dashed line with an arrow in the combustion chamber 8.

An intake side timing pulley 15 and an exhaust side timing pulley 16 are coupled with the crankshaft 7 via a timing belt 14. An intake camshaft 17 is attached to the intake side timing pulley 15 through a variable valve timing mechanism 19, to be described later. Also, an exhaust camshaft 18, which rotates integrally with the exhaust side timing pulley 16, is attached to the exhaust side timing pulley 16.

An intake valve 12 and an exhaust valve 13 which are provided for the combustion chamber 8 open and close the intake ports 9a, 9b and exhaust ports 10a, 10b, respectively. Opening and closing of the intake valve 12 and the exhaust valve 13 are performed by cams (not shown) which are provided in the intake camshaft 17 and the exhaust camshaft 18. When the crankshaft 7 rotates twice, the intake side timing pulley 15 and the exhaust side timing pulley 16 each rotate once. Accordingly, opening and closing of the intake valve 12 and the exhaust valve 13 are performed in synchronization with the rotation of the crankshaft 7, that is, at a predetermined timing that corresponds with the reciprocating movement of the piston 5.

Various sensors for detecting an engine operation state are provided in the gasoline engine 1. For example, a crank angle sensor 41 which is provided in the vicinity of the crankshaft 7 outputs a pulse signal at intervals in accordance with a speed of the gasoline engine 1 based on the rotation of the crankshaft 7. Then, a speed (i.e., an engine speed) NE of the gasoline engine 1 (i.e., of the crankshaft 7) is detected based on this output signal. A cam angle sensor 42 which is provided in the vicinity of the intake camshaft 17 outputs a pulse signal that is used as a reference signal for each predetermined rotation based on the rotation of the intake camshaft 17. Then, a cam angle (i.e., a relative phase with respect to the crankshaft 7) of the intake camshaft 17 is detected based on the signals output from the crank angle sensor 41 and the cam angle sensor 42. A throttle opening sensor 43 which is provided in the vicinity of the throttle valve 23 detects an opening TA (i.e., a throttle opening TA) of the throttle valve 23. A swirl valve opening sensor 44 which is provided in the vicinity of the SCV 24 detects an opening VA (i.e., an SCV opening VA) of the SCV 24. A thermal air flow meter 45, in which an output GA according to a rate of the intake air flowing through the intake passage 20 can be obtained, is provided upstream of the throttle valve.

A control unit (hereinafter, referred to as an "ECU") 50 performs various controls such as ignition timing control of the gasoline engine 1, fuel injection amount control, SCV opening control, and VVT mechanism phase control. The ECU 50 includes a microcomputer which has a central processing unit (CPU) as a main portion. Namely, the ECU 50 includes read-only memory (ROM) in which various programs, a map and the like are previously stored, random access memory (RAM) in which computation results of the CPU and the like are temporarily stored, backup RAM for storing the computation results, the previously stored data and the like even after the engine is stopped, an input interface, an output interface and the like. Signals output from the crank angle sensor 41, the cam angle sensor 42, the throttle opening sensor 43, the swirl valve opening sensor 44, the air flow meter 45, and the like are input to the input interface. The operation state of the gasoline engine 1 is detected by these sensors 41 to 45 and the like.

The output interface is connected to the fuel injection valve 35, an ignition coil (not shown) which applies a high voltage to the spark plug 11, the actuator 22 for the throttle valve 23, an actuator 25 for the SCV 24 and the like, through a corresponding drive circuit and the like. The ECU 50 controls each of the above-mentioned valves, ignition coil, actuators and the like according to a control program and initial data which are stored in the ROM, based on signals output from the sensors 41 to 45 and the like.

The ECU 50 calculates the rate of the intake air based on a corrected air flow meter output GAH from the air flow meter 45. The ECU 50 then calculates a basic fuel injection amount and the like based on the calculated intake flow rate and the engine speed NE and the like, and performs a correction by increasing or decreasing the fuel injection amount using the fuel injection valve 35, such that an air-fuel ratio of the air-fuel mixture becomes equal to a target air-fuel ratio.

The ECU 50 according to the embodiment stores the basic intake flow rate in accordance with the engine operation state at a reference atmospheric pressure, and performs atmospheric pressure learning in which the atmospheric pressure is detected by comparing the basic intake flow rate with the actual intake flow rate detected by the air flow meter 45.

The above-mentioned thermal air flow meter 45 has superior characteristics compared to the vane air flow meter, and is currently widely used as a flow rate sensor in internal combustion engines. The thermal air flow meter 45 has the following characteristics. The air flow meter 45 senses not only the rate of the air flowing toward the combustion chamber 8 but also the rate of the air which is generated due to intake pulsation, that is, the rate of the air flowing in a reverse direction, as the rate of the air that is taken into the combustion chamber 8. Accordingly, when the intake pulsation is generated, detection by the thermal air flow meter 45 is directly affected by the intake pulsation, and the output (detected value) therefrom tends to be larger than the actual intake flow rate.

The air flow meter 45 detects the intake flow rate by making part of the air flowing through the intake passage 20 pass through a detecting portion of the air flow meter 45. Accordingly, in the case where the state of the drift (i.e., dispersion in the distribution of the air flow rate in the intake passage, such as an increase in the air flow rate closer to a wall surface of the intake passage) changes in the intake passage 20, even when there is no change in the intake flow rate itself, the output from the air flow meter 45 becomes different from the value detected before the state of the drift changed. Thus, an error in a detection performed by the air flow meter 45 (hereinafter, referred to as an "air flow meter 45 detection error") is caused not only by the above-mentioned intake pulsation, but also by the drift in the intake passage.

Therefore, the intake flow rate detecting apparatus according to the embodiment obtains a pulsation/drift correction coefficient K for compensating for the air flow meter 45 detection error due to the intake pulsation or the drift, and corrects the output from the air flow meter 45 using this pulsation/drift correction coefficient K. In this case, accurately obtaining the pulsation/drift correction coefficient K according to the intake pulsation and the drift which change in accordance with the engine operation state is an important factor in accurately detecting the intake flow rate. Accordingly, in the embodiment, the accurate pulsation/drift coefficient K is obtained by performing the following routine for correcting the output from the air flow meter.

Figure 3:
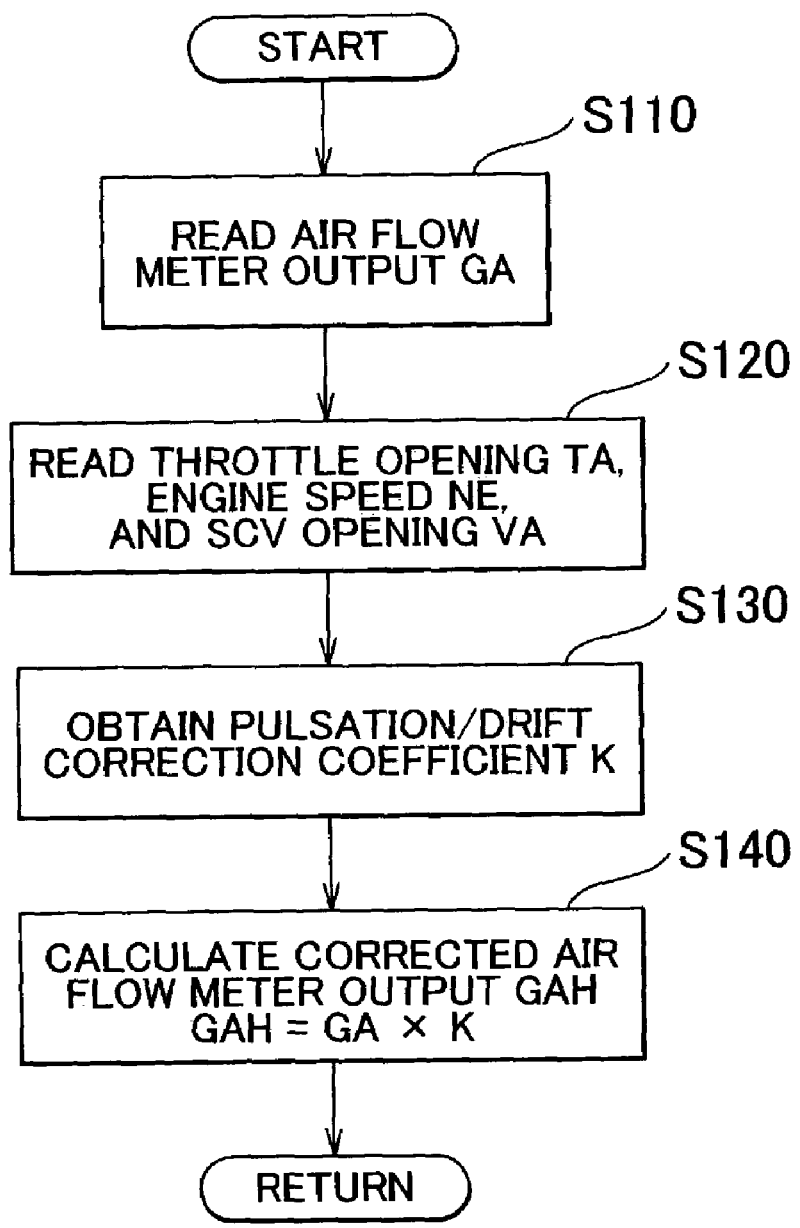
FIG. 3 is a flowchart showing a routine for correcting an output from an air flow meter according to a first embodiment.

FIG. 3 shows the routine for correcting the output from the air flow meter using the intake flow rate detecting apparatus according to the embodiment. The process of correcting the output from the air flow meter is an interruption routine which is repeatedly performed by the ECU 50 at predetermined intervals of time.

When this process is started, the air flow meter output GA 45 (hereinafter, referred to as "air flow meter 45 output GA") is initially read (step S110). Next, the throttle opening TA, the engine speed NE, and the SCV opening VA are read (step S120).

Next, the pulsation/drift correction coefficient K is obtained based on the throttle opening TA, the engine speed NE, and the SCV opening VA according to a map which is stored in the ROM of the ECU 50 (step S130).

The pulsation/drift correction coefficient K is a correction coefficient for compensating for the air flow meter 45 detection error due to the intake pulsation and the drift. The basic tendency of the relationship between the correction coefficient for compensating for the detection error due to the intake pulsation and the engine operation state, particularly the basic tendency of relationship between the pulsation correction coefficient for compensating for the detection error due to the intake pulsation and the engine operation state will be described with reference to graphs in FIGS. 4A and 4B. The pulsation/drift correction coefficient K is also used as a value for compensating for the detection error due to the drift. The drift changes according to the engine operation state. The intake pulsation also changes according to the engine operation state. Accordingly, the optimum value of the actual pulsation/drift correction coefficient K is obtained according to the engine operation state through an experiment or the like. Accordingly, the graphs in FIGS. 4A, 4B only show basic tendencies, and do not show that the pulsation/drift correction coefficient K in a map stored in the ROM also has such tendencies.

Figure 4A:
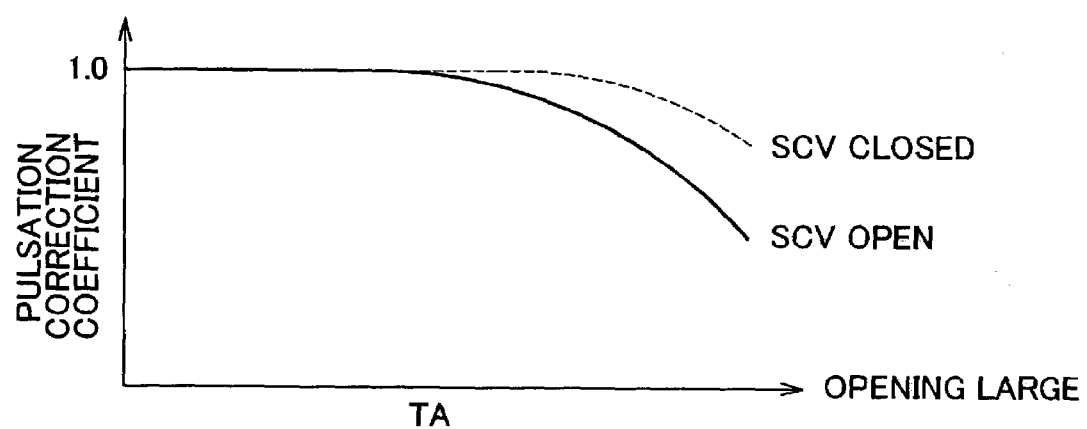
FIG. 4 is a graph exemplifying a tendency of a pulsation correction coefficient.

First, FIG. 4A shows the tendency of a pulsation correction coefficient with respect to the throttle opening TA and the SCV opening VA (the operation amount of the SCV 24), and a solid curved line in FIG. 4A shows the tendency of the pulsation correction coefficient with respect to the throttle opening TA when the SCV is fully open. A curved dashed line in FIG. 4A shows the tendency of the pulsation correction coefficient when the SCV is fully closed. In this case, the pulsation correction coefficient is the value for correcting the air flow meter output GA when the air flow meter output GA is larger than the output corresponding to the actual intake flow rate. Therefore, hereinafter, the case in which the pulsation correction coefficient is large signifies a case in which correction is made such that the air flow meter output GA becomes smaller, and in actuality signifies a case in which the value of the pulsation correction coefficient becomes closer to "zero". As shown by a solid line or a dashed line in FIG. 4A, as the throttle opening TA becomes larger, it becomes easier for the intake pulsation to reach the air flow meter 45, which makes the air flow meter output GA larger than the output corresponding to the actual intake flow rate. Therefore, as the throttle opening TA becomes larger, the pulsation correction coefficient is made larger. When the SCV is fully open, the intake pulsation is difficult to interrupt by the SCV compared to when the SCV is fully closed. Accordingly, it becomes easier for the intake pulsation to reach the air flow meter 45 even when the throttle opening is the same. Also, when the SCV is fully open, the intake flow rate becomes larger compared to when the SCV is fully closed, resulting in even greater intake pulsation. Therefore, the pulsation correction coefficient is made to be large even when the SCV is fully open.

Figure 4B:
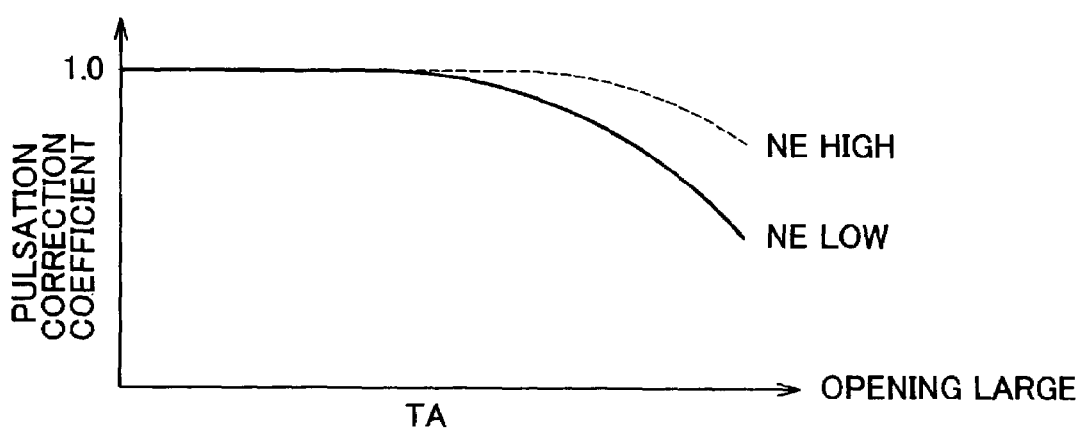

FIG. 4B shows the tendency of the pulsation correction coefficient with respect to the throttle opening TA and the engine speed NE. The solid curved line in FIG. 4B shows a tendency of the pulsation correction coefficient with respect to the throttle opening TA when the engine speed NE is low, and the dashed curved line in FIG. 4B shows the tendency of the pulsation correction coefficient with respect to the throttle opening TA when the engine speed NE is high. Generally, a natural frequency in an intake system such as the intake passage is a value close to an engine frequency at a low engine speed. Therefore, when the engine speed NE is low, resonance is likely to occur in the intake system, and the intake pulsation tends to be large due to this resonance. Therefore, even when the throttle opening TA is the same, when the engine speed is low in which resonance is likely to occur in the intake system, the value of the pulsation correction coefficient is made to be large compared to when the engine speed is high.

After the pulsation/drift correction coefficient K is obtained in step S130 (FIG. 3), the pulsation/drift correction coefficient K is multiplied by the air flow meter output GA, and the corrected air flow meter output GAH is calculated (step S140). Accordingly, the corrected air flow meter output GAH is made the output in which the error due to the intake pulsation and the drift is suppressed, afterwhich the routine ends.

Then, the ECU 50 calculates the intake flow rate based on the corrected air flow meter GAH, and obtains the fuel injection amount for performing the air-fuel ratio control or the like. In this case, since the effect of the intake pulsation and the drift on the air flow meter output GA is suppressed, it becomes possible to calculate the intake flow rate with high accuracy and perform appropriate air-fuel ratio control.

Also, in the above-mentioned atmospheric pressure learning, since the accuracy of detecting the intake flow rate is enhanced, the accuracy of the atmospheric learning is also enhanced. Conventionally, as disclosed in Japanese Patent Laid-Open Publication No. 10-339205, a device has been proposed which corrects the throttle opening that corresponds to the target intake flow rate in accordance with the operation states of the variable valve mechanism and the swirl control valve, and which obtains the variable indicative of the intake pulsation based on the corrected throttle opening. However, since the device disclosed in this publication obtains the pulsation correction coefficient based on the throttle opening, the following problem cannot be avoided depending on the relationship between the target intake flow rate and the operation states of the variable valve mechanism and swirl control valve. That is, for example, when the target intake flow rate is increased and the increment of that increase is offset by a change in the operation state of the variable valve mechanism or the swirl control valve, the throttle opening itself may be maintained at the same value despite the fact that the target intake flow rate is increased. However, in this case, since the pulsation correction coefficient is obtained based on the throttle opening, the value of the pulsation correction coefficient which actually needs to be obtained as a larger value is obtained as the same value. As a matter of course, even when the output from the air flow meter is corrected based on such a pulsation correction coefficient, the air flow meter detection error cannot be appropriately compensated for.

Meanwhile, the flow rate detector according to the embodiment obtains the pulsation/drift correction coefficient K based on the operation amount of the above-mentioned SCV 24. Accordingly, the air flow meter 45 detection error due to the intake pulsation and the drift can be compensated for more appropriately.

As described above, according to the flow rate detector according to the embodiment, the following effect can be obtained. (1) In the thermal air flow meter 45, the detection error due to the intake pulsation and the drift is likely to occur. However, in the embodiment, the pulsation/drift correction coefficient K is obtained based on the operation amount (i.e., the SCV opening VA) of the flow rate control mechanism, the throttle opening TA, and the engine speed NE which affect the intake pulsation and the drift. Accordingly, the air flow meter 45 detection error due to intake pulsation and drift can be appropriately compensated for, consequently, the intake flow rate detection can be performed with high accuracy.

(2) As mentioned above, since the accuracy of detecting the intake flow rate is enhanced, various engine controls performed based on the intake flow rate and calculation of a learning value, for example, air-fuel ratio control and atmospheric pressure learning can be appropriately performed. Accordingly, in the gasoline engine 1 including the intake flow rate detecting apparatus according to the embodiment, exhaust gas emissions can be reduced and drivability and the like can be enhanced.

(Second embodiment) Next, a second embodiment of an intake flow rate detecting apparatus of an internal combustion engine according to the invention will be described in detail.

In the first embodiment, an effect from the intake pulsation and the drift on an output from the air flow meter 45 is avoided by obtaining the optimum pulsation/drift correction coefficient K according to the engine operation state. In addition to the intake pulsation and the drift, there are various causes of increased air flow meter 45 detection error.

For example, when a detecting portion of the air flow meter 45 gets wet due to rain water getting into the intake passage 20, condensation on an inside wall or the like, the output (a value detected by) from the air flow meter 45 becomes extremely large. In this case, even when the output from the air flow meter 45 is corrected by the pulsation/drift correction coefficient K, the detected intake flow rate becomes larger than the actual intake flow rate. Accordingly the intake flow rate may not be obtained accurately.

Accordingly, in the embodiment, the intake flow rate is prevented from being calculated based on an excessive output which should not be output based on the present intake flow rate, by setting an optimum upper limit for the output from the air flow meter 45 according to the engine operation state.

Next, the intake flow rate detecting apparatus according to the embodiment will be described in detail with reference to the flowchart in FIG. 5. The embodiment is configured by adding the processes in steps S210 to S240 to the air flow meter output correction routine shown in FIG. 3 in the first embodiment. The processes except for those in steps S210 to S240 are the same as those in the first embodiment. Also, the air flow meter output routine is an interruption routine which is repeatedly performed by the ECU 50 at predetermined intervals of time.

Figure 5:
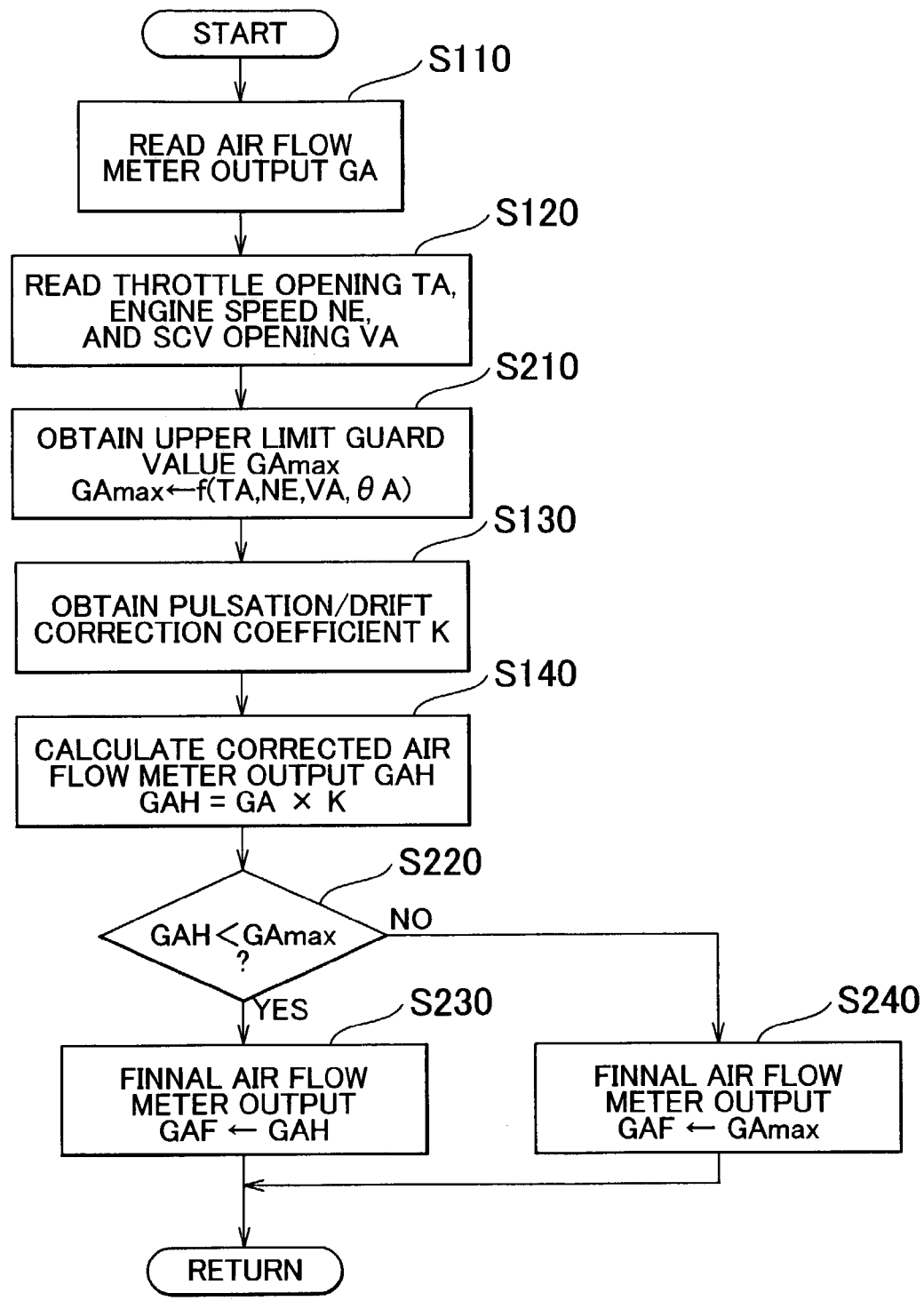
FIG. 5 is a flowchart showing a routine for correcting an output from an air flow meter according to a second embodiment.

When the routine shown in FIG. 5 is started, the air flow meter 45 output GA is initially read (step S110). Next, the throttle opening TA, the engine speed NE and the SCV opening VA are read (step S120).

Next, an upper limit guard value GAmax for the output from the air flow meter 45 is obtained based on the throttle opening TA, the engine speed NE, and the SCV opening VA, according to the map stored in the ROM of the ECU 50 (step S210). In the embodiment, a value, in which a predetermined increment is added to the output from the air flow meter 45 which corresponds to the maximum intake flow rate that is estimated based on the throttle opening TA, the engine speed NE, the SCV opening VA, is the upper limit guard value GAmax. Alternatively, the output from the air flow meter 45 which corresponds to the estimated maximum intake flow rate may be the upper limit guard value.

Next, the pulsation/drift correction coefficient K is obtained based on the throttle opening TA, the engine speed NE, the SCV opening VA, according to the map stored in the ROM of the ECU 50 (step S130). This pulsation/drift correction coefficient K is the same value as the one described in the first embodiment.

Next, the pulsation /drift correction coefficient K is multiplied by the air flow meter output GA, and the corrected air flow meter output GAH is calculated (step S140). Thus, the corrected air flow meter output GAH is the output in which the error due to the intake pulsation and the drift is suppressed.

Next, the corrected air flow meter output GAH and the upper limit guard value GAmax are compared (step S220). Then, when the corrected air flow meter output GAH is smaller than the upper limit guard value GAmax (YES in step S220), the corrected air flow meter output GAH is made the final air flow meter output GAF (step S230), afterwhich the routine ends.

Meanwhile, when the corrected air flow meter output GAH is equal to or larger than the upper limit guard value GAmax (NO in step S220), it is considered that the output from the air flow meter 45 is extremely large, and the corrected air flow meter output GAH is an unreliable value. Accordingly the upper limit guard value GAmax is made the final air flow meter output GAF (step S240), afterwhich the routine ends.

Then, the ECU 50 calculates the intake flow rate based on the thus calculated final air flow meter output GAF. The fuel injection amount and the like for performing air-fuel ratio control is obtained, and the atmospheric learning is performed based on this calculated intake flow rate.

As described above, according to a flow rate detection method according to the second embodiment, the following effects can be obtained. (1) The upper limit guard value GAmax for the output from the air flow meter 45 is set based on the operation amount (the SCV opening VA) of the flow rate control mechanism, the throttle opening TA and the engine speed NE, which affect the intake flow rate. Then, when the corrected air flow meter output GAH is equal to or larger than the upper limit guard value GAmax, the upper limit guard value GAmax is made the final air flow meter output GAF. Accordingly, even when the output from the air flow meter 45 becomes excessively large due to the states of the intake pulsation and the drift, that is, due to factors other than the state of the air flowing through the intake passage 20, the air flow meter 45 detection error can be suppressed.

(2) As mentioned above, reliability of various engine controls and calculations of the learning values which are performed based on the intake flow rate, for example, the reliability of the air-fuel ratio control and the atmospheric pressure learning, is enhanced since the intake flow rate detection error is suppressed. Therefore, in the gasoline engine 1 including the intake flow rate detecting apparatus according to the invention, exhaust gas emissions can be reduced and drivability and the like can be enhanced.

(Other embodiments) Each of the above-mentioned embodiments may be modified. Even when a modification is made, an effect which is substantially same as that in the above-mentioned embodiments can be obtained.

In each of the embodiments, the pulsation/drift correction coefficient K is obtained which compensates for the air flow meter 45 detection errors due to the intake pulsation and the drift simultaneously. However, a pulsation correction coefficient may be obtained which compensates for the air flow meter 45 detection error due to the intake pulsation. In this case, a drift correction coefficient may be separately obtained which compensates for the air flow meter 45 detection error due to the drift.

Figure 6:
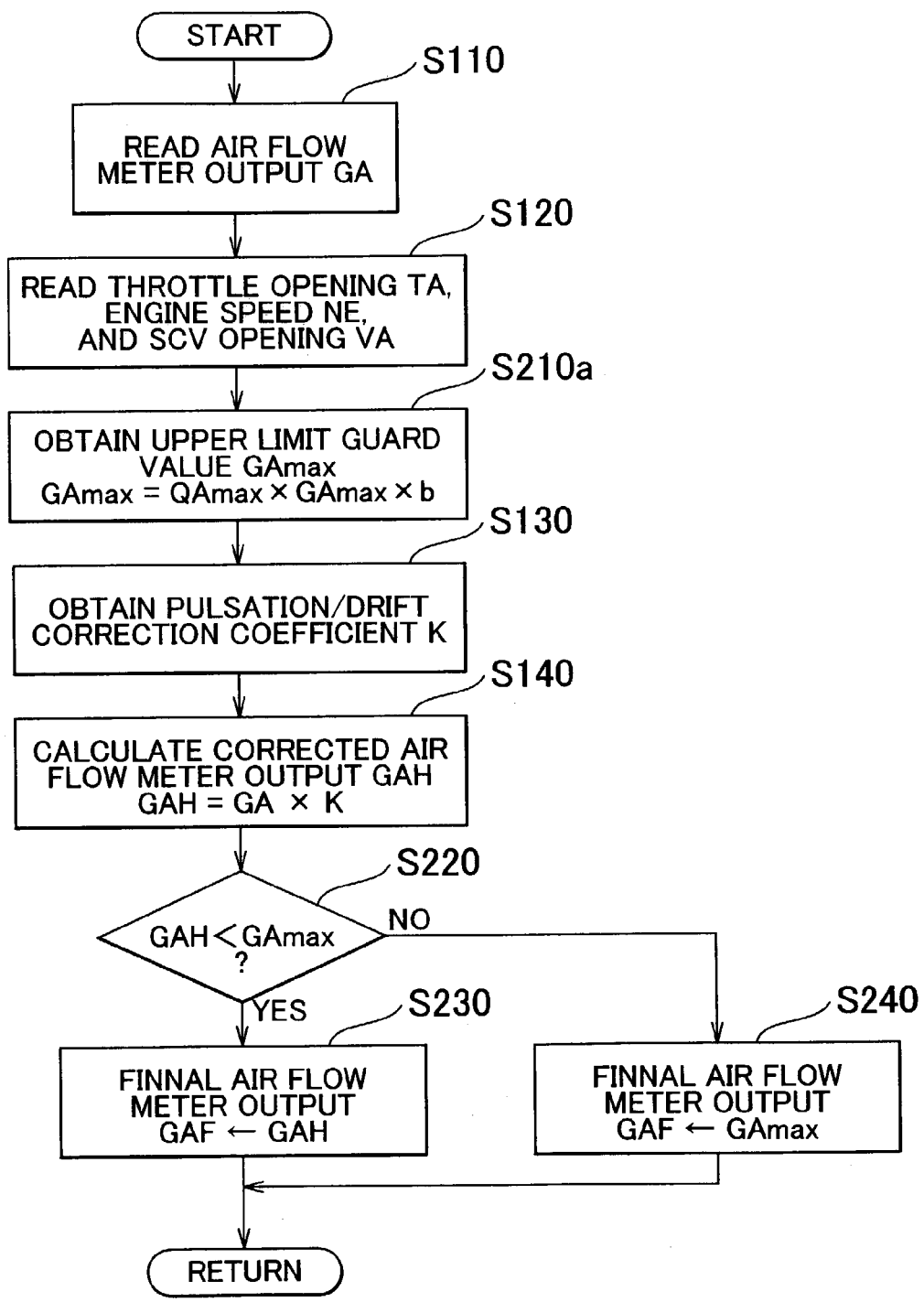
FIG. 6 is a flowchart showing a routine for correcting an output from an air flow meter according to other embodiments.

In the second embodiment, the upper limit guard value GAmax is directly obtained based on the operation amount (the SCV opening VA) of the flow rate control mechanism, the throttle opening TA, and the engine speed NE. However, the upper limit guard value GAmax may be obtained by calculating a correction coefficient GAmaxb based on these parameters, and then multiplying this correction coefficient by a maximum intake flow rate Qmax, which is the maximum rate of air that can be taken in when the gasoline engine 1 is at full load. In this case, the air flow meter output correction process is configured by replacing the process in step S210 shown in FIG. 5 in the second embodiment by the process in step S210*a*, as shown in FIG. 6.

In the second embodiment, the upper limit guard value GAmax for the corrected air flow meter output GAH is obtained based on the operation amount (the SCV opening VA) of the flow rate control mechanism, the throttle opening TA, and the engine speed NE. In this case, the intake flow rate detected by the air flow meter may be different from the actual rate of air taken into the cylinder. In this case, a pressure value such as an intake pipe pressure, a port pressure or a cylinder pressure is obtained based on the output from the air flow meter and the engine speed and the like, and the actual rate of air taken into the cylinder is obtained based on that pressure value. In the intake flow rate detecting apparatus of an internal combustion engine which performs such a process, the upper limit for the calculated pressure value may be set based on the operation amount (the SCV opening VA) of the flow rate control mechanism, the throttle opening TA, and the engine speed NE, instead of the upper limit guard value GAmax. Even when the output from the air flow meter becomes excessively large, error detection in the rate of the air which is taken into the cylinder can be suppressed by setting such an upper limit for the pressure value.

In each of the embodiments, the SCV 24 is given as an example of a flow rate control mechanism which controls the flow rate of the air in the intake passage (or more accurately, between the combustion chamber and the throttle valve). However, other than the SCV 24, the following flow rate control mechanisms also have an effect on the intake pulsation, the drift or the intake flow rate.

Figure 7:
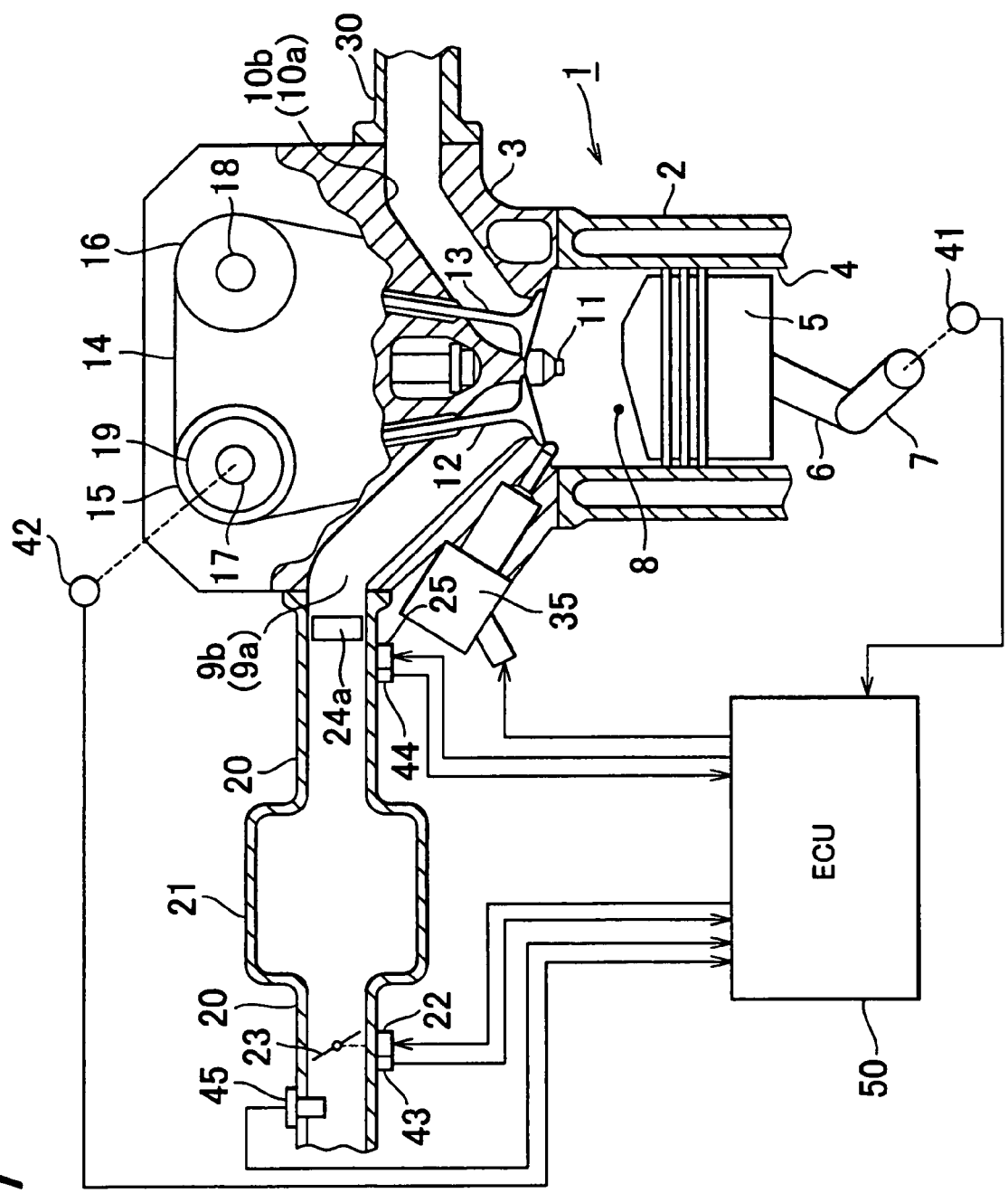
FIG. 7 is a schematic diagram showing another embodiment of a gasoline engine according to the present invention.

For example, as shown in FIG. 7, the variable intake mechanism 24*a* is a mechanism which fully utilizes the intake inertia effect and the pulsation effect so as to enhance the intake efficiency by changing the length of the intake passage (i.e., the effective length of the intake pipe) through which the intake air flows. Such a variable intake mechanism is well known, as evidenced in, for example, JP HEI 10-196373, JP 2000-328947 A and JP 2001-303960 A. Accordingly, when the operation amount of the variable intake mechanism changes, the flow rate of the air flowing through the intake passage changes, and consequently the states of the intake pulsation and the drift change.

Since the intake flow rate changes and the states of the intake pulsation and the drift change according to the operation amount of the variable intake mechanism, the operation amount of the variable intake mechanism may be added as the operation amount of the flow rate control mechanism in each of the embodiments, in the internal combustion engine which includes these mechanisms. Also, the pulsation/drift correction coefficient K and the upper limit guard value GAmax may be calculated based on at least one of the operation amounts of the SCV24 and the variable intake mechanism, the throttle opening TA and the engine speed NE. In this case, the map for obtaining the pulsation/drift correction coefficient K and the upper limit guard value GAmax can be simplified.

In each of the above-mentioned embodiments, the intake flow rate detecting apparatus according to the invention is applied to the gasoline engine 1. However, the internal combustion engine to which the intake flow rate detecting apparatus according the invention is applied is not limited to this gasoline engine 1. Namely, when the internal combustion engine includes a flow rate control mechanism which is provided between the throttle valve and the combustion chamber, and which controls the flow rate of the air between the throttle valve and the combustion chamber, the intake flow rate detecting apparatus according to the first embodiment or the second embodiment can be applied thereto.

In each of the above-mentioned embodiments, the pulsation/drift correction coefficient K is obtained based on the throttle opening TA, the engine speed NE, the SCV opening VA according to the map stored in the ROM of the ECU 50. However, the correction coefficient K may be obtained by storing two types of maps showing the relationship between the throttle opening TA and the engine speed NE, one type of which corresponds to the SCV open state and the other of which corresponds to the SCV closed state, in the ROM, and selecting the map according to the SCV state.

What is claimed is:

1. An intake flow rate detecting apparatus, comprising:
    a throttle valve which is provided in an intake passage and which adjusts a rate of air that is taken into a combustion chamber of an internal combustion engine;
    at least one flow rate control mechanism which is provided between the throttle valve and an intake valve adjacent to the combustion chamber and which controls an air flow rate between the throttle valve and the combustion chamber;
    a flow rate sensor which is provided upstream of the throttle valve in the intake passage and which detects a flow rate of air flowing through the intake passage; and
    a correcting portion which corrects a detection value of the flow rate sensor based on an opening of the throttle valve relative to an operation amount of the flow rate control mechanism and a speed of the internal combustion engine.

2. An intake flow rate detecting apparatus, comprising:
    a throttle valve which is provided in an intake passage and which adjusts a rate of air that is taken into a combustion chamber of an internal combustion engine;
    at least one flow rate control mechanism which is provided between the throttle valve and the combustion chamber and which controls an air flow rate between the throttle valve and the combustion chamber;
    a flow rate sensor which is provided upstream of the throttle valve in the intake passage and which detects a flow rate of air flowing through the intake passage;
    a correcting portion which corrects a detection value of the flow rate sensor based on an opening of the throttle valve, an operation amount of the flow rate control mechanism and a speed of the internal combustion engine; and
    an upper limit calculating portion which obtains an upper limit for the detection value of the flow rate sensor based on the opening of the throttle valve, the operation amount of the flow rate control mechanism, and the speed of the internal combustion engine, wherein the upper limit calculating portion calculates the upper limit as a rate of the air which is actually taken into the combustion chamber when the corrected detection value of the flow rate sensor exceeds the upper limit.

3. The intake flow rate detecting apparatus according to claim 2, wherein correction of the detection value of the flow rate sensor is performed as compensation for an intake pulsation according to a speed of the internal combustion engine at an operation time of the throttle valve and the flow rate control mechanism, following an operation of the throttle valve and the flow rate control mechanism.

4. The intake flow rate detecting apparatus according to claim 2, wherein correction of the detection value of the flow rate sensor is performed as compensation for both the intake pulsation and an air drift in the vicinity of the flow rate sensor according to the speed of the internal combustion engine at an operation time of the throttle valve and the flow rate control mechanism, following the operation of the throttle valve and the flow rate control mechanism.

5. The intake flow rate detecting apparatus according to claim 2, wherein the correcting portion makes a correction based on a correction coefficient.

6. The intake flow rate detecting apparatus according to claim 5, wherein the correction coefficient is set from a preset value based on the opening of the throttle valve, the speed of the internal combustion engine, and the operation amount of the flow rate control mechanism.

7. The intake flow rate detecting apparatus according to claim 5, wherein a value of the correction coefficient increases with an increase in the opening of the throttle valve.

8. An intake flow rate detecting apparatus, comprising:
    a throttle valve which is provided in an intake passage and which adjusts a rate of air that is taken into a combustion chamber of an internal combustion engine;
    at least one flow rate control mechanism which is provided between the throttle valve and the combustion chamber and which controls an air flow rate between the throttle valve and the combustion chamber, the flow rate control mechanism being a swirl control valve which provides a swirl flow to the air that is taken into the combustion chamber;
    a flow rate sensor which is provided upstream of the throttle valve in the intake passage and which detects a flow rate of air flowing through the intake passage; and
    a correcting portion which corrects a detection value of the flow rate sensor based on an opening of the throttle valve relative to an operation amount of the flow rate control mechanism and a speed of the internal combustion engine.

9. An intake flow rate detecting apparatus, comprising:
    a throttle valve which is provided in an intake passage and which adjusts a rate of air that is taken into a combustion chamber of an internal combustion engine;
    at least one flow rate control mechanism which is provided between the throttle valve and the combustion chamber and which controls an air flow rate between the throttle valve and the combustion chamber, the flow rate control mechanism being a variable intake mechanism which changes an effective length of the intake passage;

a flow rate sensor which is provided upstream of the throttle valve in the intake passage and which detects a flow rate of air flowing through the intake passage; and a correcting portion which corrects a detection value of the flow rate sensor based on an opening of the throttle valve, an operation amount of the flow rate control mechanism and a speed of the internal combustion engine.

10. A detection method of an intake flow rate detecting apparatus comprising a throttle valve which is provided in an intake passage and which adjusts a rate of air that is taken into a combustion chamber of an internal combustion engine, at least one flow rate control mechanism which is provided between the throttle valve and an intake valve adjacent to the combustion chamber and which controls an air flow rate between the throttle valve and the combustion chamber, the detection method comprising the steps of:

detecting a flow rate of air flowing upstream of the throttle valve in the intake passage;

correcting the detected flow rate based on an opening of the throttle valve relative to an operation amount of the flow rate control mechanism and a speed of the internal combustion engine.

11. A detection method of an intake flow rate detecting apparatus comprising a throttle valve which is provided in an intake passage and which adjusts a rate of air that is taken into a combustion chamber of an internal combustion engine, at least one flow rate control mechanism which is provided between the throttle valve and the combustion chamber and which controls an air flow rate between the throttle valve and the combustion chamber, the detection method comprising the steps of:

detecting a flow rate of air flowing upstream of the throttle valve in the intake passage;

correcting the detected flow rate based on an opening of the throttle valve, an operation amount of the flow rate control mechanism and a speed of the internal combustion engine, calculating an upper limit for the detection value of the flow rate of air flowing upstream of the throttle valve based on the opening of the throttle valve, the operation amount of the flow rate control mechanism, and the speed of the internal combustion engine, wherein the upper limit is calculated as a rate of the air which is actually taken into the combustion chamber when the corrected detection value of the flow rate of air flowing upstream of the throttle valve exceeds the upper limit.

12. A detection method of an intake flow rate detecting apparatus comprising a throttle valve which is provided in an intake passage and which adjusts a rate of air that is taken into a combustion chamber of an internal combustion engine, at least one flow rate control mechanism which is provided between the throttle valve and the combustion chamber and which controls an air flow rate between the throttle valve and the combustion chamber, wherein the flow rate control mechanism is a swirl control valve which provides a swirl flow to the air that is taken into the combustion chamber, the detection method comprising the steps of:

detecting a flow rate of air flowing upstream of the throttle valve in the intake passage; and correcting the detected flow rate based on an opening of the throttle valve relative to an operation amount of the flow rate control mechanism and a speed of the internal combustion engine.

13. A detection method of an intake flow rate detecting apparatus comprising a throttle valve which is provided in an intake passage and which adjusts a rate of air that is taken into a combustion chamber of an internal combustion engine, at least one flow rate control mechanism which is provided between the throttle valve and the combustion chamber and which controls an air flow rate between the throttle valve and the combustion chamber, wherein the flow rate control mechanism is a variable intake mechanism which changes an effective length of the intake passage, the detection method comprising the steps of:

detecting a flow rate of air flowing up stream of the throttle valve in the intake passage; and correcting the detected flow rate based on an opening of the throttle valve, an operation amount of the flow rate control mechanism and a speed of the internal combustion engine.

* * * * *